(12) United States Patent
Ciani et al.

(10) Patent No.: US 9,822,981 B2
(45) Date of Patent: Nov. 21, 2017

(54) MIXING ARRANGEMENT FOR MIXING A FUEL WITH A STREAM OF OXYGEN CONTAINING GAS

(71) Applicant: ALSTOM Technology Ltd, Baden (CH)

(72) Inventors: Andrea Ciani, Zürich (CH); Hanspeter Knoepfel, Dottikon (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 208 days.

(21) Appl. No.: 14/493,839

(22) Filed: Sep. 23, 2014

(65) Prior Publication Data

US 2015/0013339 A1    Jan. 15, 2015

Related U.S. Application Data

(63) Continuation of application No. PCT/EP2013/056013, filed on Mar. 22, 2013.

(30) Foreign Application Priority Data

Mar. 26, 2012  (EP) .................................... 12161165

(51) Int. Cl.
*F23R 3/34* (2006.01)
*F23R 3/28* (2006.01)
(Continued)

(52) U.S. Cl.
CPC ................ *F23R 3/286* (2013.01); *F02K 3/10* (2013.01); *F23D 91/02* (2015.07); *F23R 3/18* (2013.01);
(Continued)

(58) Field of Classification Search
CPC .... F23R 3/286; F23R 3/18; F23R 3/34; F23R 3/346; F02K 3/10
(Continued)

(56) References Cited

U.S. PATENT DOCUMENTS 2,825,205 A * 3/1958 Racine ...................... F02K 3/12
60/263
3,788,065 A * 1/1974 Markowski ............... F23R 3/34
431/173
(Continued)

FOREIGN PATENT DOCUMENTS

CN      1117567 A     2/1996
CN      1130718 A     9/1996
(Continued)

OTHER PUBLICATIONS

Office Action (Notification of Reasons for Refusal) dated Nov. 30, 2015, by the Japanese Patent Office in corresponding Japanese Patent Application No. 2015-202228 (10 pgs).
(Continued)

*Primary Examiner* — Steven Sutherland
(74) *Attorney, Agent, or Firm* — Buchanan Ingersoll & Rooney PC

(57) ABSTRACT

The invention relates to a mixing arrangement for mixing a fuel with a stream of oxygen containing gas flowing along an axis in an axial channel, especially in the second combustor of a gas turbine with sequential combustion. The mixing is improved and the mixing length reduced by said mixing arrangement comprising an injector with at least one injector ring, which is passed by said stream of gas inside and outside.

18 Claims, 3 Drawing Sheets

(51) Int. Cl.
*F02K 3/10* (2006.01)
*F23R 3/18* (2006.01)
*F23D 99/00* (2010.01)

(52) U.S. Cl.
CPC ............... *F23R 3/34* (2013.01); *F23R 3/346* (2013.01); *F23R 2900/03041* (2013.01)

(58) Field of Classification Search
USPC ............................. 60/737, 740, 748, 733, 761
See application file for complete search history.

(56) References Cited

U.S. PATENT DOCUMENTS

| | | | | |
|---|---|---|---|---|
| 3,974,646 | A * | 8/1976 | Markowski | F23R 3/20 244/200.1 |
| 5,351,474 | A | 10/1994 | Slocum et al. | |
| 5,351,477 | A * | 10/1994 | Joshi et al. | F23C 7/004 239/400 |
| 5,452,574 | A | 9/1995 | Cowell et al. | |
| 5,454,220 | A * | 10/1995 | Althaus | F02C 6/003 60/39.17 |
| 5,645,410 | A | 7/1997 | Brostmeyer | |
| 6,192,688 | B1 | 2/2001 | Beebe | |
| 6,446,439 | B1 | 9/2002 | Kraft et al. | |
| 6,453,672 | B1 * | 9/2002 | Kendall et al. | F23D 14/16 431/328 |
| 8,192,688 | B2 * | 6/2012 | Hagen et al. | F01K 21/047 422/129 |
| 8,453,454 | B2 | 6/2013 | Lacy et al. | |
| 8,555,646 | B2 * | 10/2013 | Stevenson et al. | F23D 14/64 60/737 |
| 2010/0300109 | A1 * | 12/2010 | Carroni et al. | F23R 3/286 60/776 |
| 2011/0031333 | A1 | 2/2011 | Short | |
| 2011/0252802 | A1 * | 10/2011 | Lacy et al. | F23R 3/286 60/737 |

FOREIGN PATENT DOCUMENTS

| | | |
|---|---|---|
| CN | 1283253 A | 2/2001 |
| CN | 101818907 A | 9/2010 |
| CN | 101995019 A | 3/2011 |
| EP | 0 620 362 A1 | 10/1994 |
| EP | 2 211 109 A1 | 7/2010 |
| EP | 2378203 A2 | 10/2011 |
| JP | 30-09353 A | 3/1958 |
| JP | 51-10212 A | 1/1976 |
| JP | S59-202324 A | 11/1984 |
| JP | H11-14055 A | 1/1999 |
| WO | 2011/037646 A1 | 3/2011 |
| WO | 2011/054739 A2 | 5/2011 |
| WO | 2011/054757 A2 | 5/2011 |
| WO | 2011/054766 A2 | 5/2011 |

OTHER PUBLICATIONS

Office Action (Decision of Refusal) dated Aug. 1, 2016, by the Japanese Patent Office in corresponding Japanese Patent Application No. 2015-502228, and an English Translation of the Office Action. (6 pages).

Communication pursuant to Article 94(3) EPC issued on Sep. 7, 2017, by the European Patent Office in corresponding European Patent Application No. 13712525.8 (7 pages).

* cited by examiner

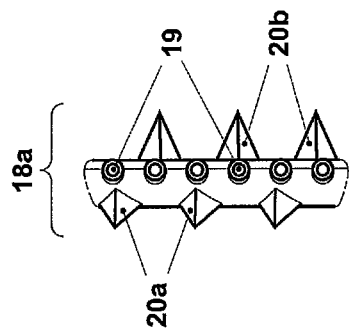
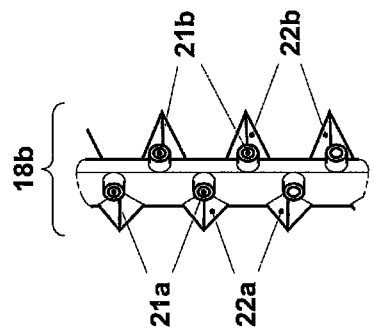
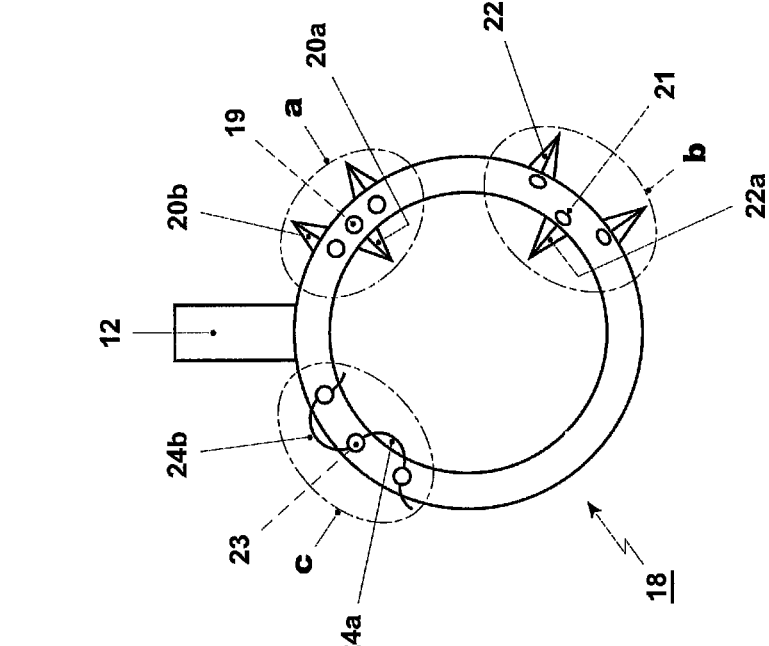
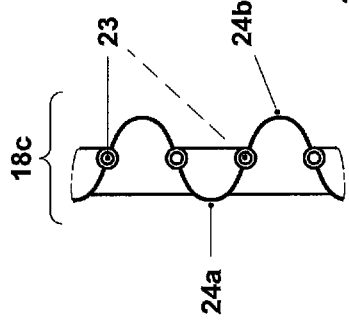
FIG. 3a
FIG. 3b
FIG. 3
FIG. 3c

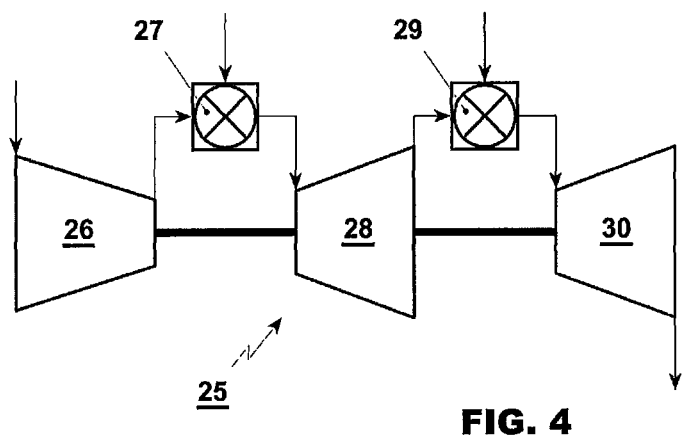
FIG. 4
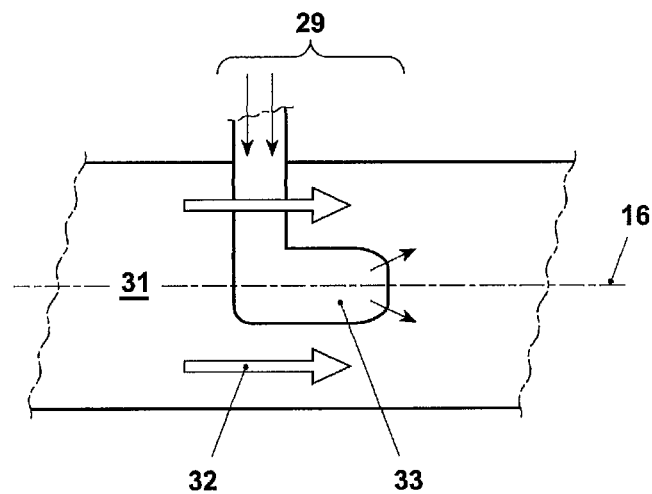
Prior Art  FIG. 5

MIXING ARRANGEMENT FOR MIXING A FUEL WITH A STREAM OF OXYGEN CONTAINING GAS

CROSS-REFERENCE TO RELATED APPLICATIONS

This application claims priority to PCT/EP2013/056013 filed Mar. 22, 2013, which claims priority to European application 12161165.1 filed Mar. 26, 2012, both of which are hereby incorporated in their entireties.

TECHNICAL FIELD

The present invention relates to the technology of gas turbines. It refers to a mixing arrangement for mixing a fuel with a stream of oxygen containing gas according to the preamble of claim 1.

BACKGROUND

Gas turbines with sequential combustion are well known in the art. FIG. 4 shows the general scheme of a gas turbine 25 with sequential combustion. The gas turbine of FIG. 4 comprises a compressor 26, a first combustor 27, a first high-pressure turbine 28, a second combustor 29 and the low-pressure turbine 30. The second combustor 29 reheats the exhaust gas of the first turbine 28 by injecting fuel into the hot gas stream. This is for example done by a mixing arrangement according to FIG. 5, where an actually extending fuel lance 33 is placed in a hot gas channel 31 to inject one or more fuels into the hot gas 32 streaming along an axis 16.

Such a gas turbine reheat system (sequential combustion) proved to excel in achieving very low emissions at high firing temperature in big industrial gas turbines of the type GT24/GT26.

Such combustion system fulfils also a number of stringent requirements such as: low pressure drop, low cooling air consumption, long lifetime, fuel flexibility.

One of the key elements the reheat combustion systems relies on, is the mixing levels achieved between hot gas and fuel before the flame.

The concepts developed up to now provide very good mixing levels and combustion performances.

However, they rely either on high momentum flux ratios, complicated geometries or complex sealing systems between the fuel injector and the hot gas path (see for example documents U.S. Pat. No. 5,645,410, WO 2011/037646 A1, U.S. Pat. No. 5,351,474 A, U.S. Pat. No. 6,192,688 B1, WO 2011/054757, WO 2011/054766 or EP 2 211 109 A1).

The multipoint injection systems described in document WO 2011/054757 and in document WO 2011/054766 provide an effective way to mix the fuel and hot gas with minimal pressure drop, by using a multipoint injection scheme, supported by fluid-dynamic structure generated by dedicated vortex generators or lobes.

SUMMARY

It is an object of the present invention to provide a mixing arrangement for sequential combustion applications, which results in an improved mixing and a shorter mixing length.

This and other objects is obtained by a mixing arrangement according to claim 1.

The mixing arrangement for mixing a fuel with a stream of oxygen containing gas flowing along an axis in an axial channel, especially in the second combustor of a gas turbine with sequential combustion is characterised in that said mixing arrangement comprises an injector with at least one injector ring, which is passed by said stream of gas inside and outside.

According to a first embodiment of the invention said at least one injector ring is circular with respect to said axis.

According to a second embodiment of the invention said at least one injector ring has an aerodynamical profile in the axial direction.

Especially, said at least one injector ring has the aerodynamical profile of a symmetric airfoil with the symmetry plane being aligned with said axis.

According to another embodiment of the invention said at least one injector ring is designed to inject a plurality of streams of different fluids.

Especially, said at least one injector ring is designed to inject a stream of liquid fuel, especially oil, a stream of air and a stream of fuel gas.

According to a further embodiment of the invention said at least one injector ring has a plurality of inline injection nozzles being distributed circumferentially, and with their injection direction being aligned with said axis.

According to another embodiment of the invention said at least one injector ring has a plurality of injection nozzles being distributed circumferentially, and with their injection direction being in crossflow orientation with respect to said stream of gas.

Preferably, vortex generators are provided on said at least one injector ring.

Especially, said vortex generators are circumferentially distributed on said at least one injector ring such that each of said vortex generators corresponds to one of said injection nozzles.

More specifically, said vortex generators are arranged alternating on the inside and on the outside of said at least one injector ring.

Alternatively, lobes are provided between neighbouring inline injection nozzles.

Especially, said lobes are extending alternating to the inside and outside of the at least one injector ring.

According to a further embodiment of the invention a plurality of injector rings is provided in a multi-ring configuration.

Specifically, the injector rings are of different size and are arranged in the same plane.

Alternatively, the injector rings are of different size and are arranged at different axial locations.

BRIEF DESCRIPTION OF THE DRAWINGS

The present invention is now to be explained more closely by means of different embodiments and with reference to the attached drawings.

FIG. 3 shows in one FIG. 3 different embodiments (a), (b) and (c) of the invention regarding in-line and crossflow arrangements and related vortex generators and lobes;

FIG. 4 shows a simplified scheme of a gas turbine with sequential combustion; and FIG. 5 shows a mixing arrangement for a reheat system according to the prior art.

DETAILED DESCRIPTION

In the present invention a system is proposed, in which a novel fuel injector is providing excellent fuel/air mixing without the need of high momentum flux ratio, and fitting a cylindrical burner. Such configuration could be well-suited for annular combustion systems (as in the GT24/GT26 gas turbines) as well as a can combustor configuration.

The present invention also relies on multipoint injection with dedicated vortex generators or lobes, which are structured in an axisymmetric manner, fitting a cylindrical burner and allowing more homogeneous fuel distribution.

The key advantage of such configuration compared with the system described in document EP 2 211 109 is its independence on the momentum flux ratio, thanks to the strong inline component of the fuel injectors as in WO 2011/054757 and in WO 2011/054766.

Figure 1:
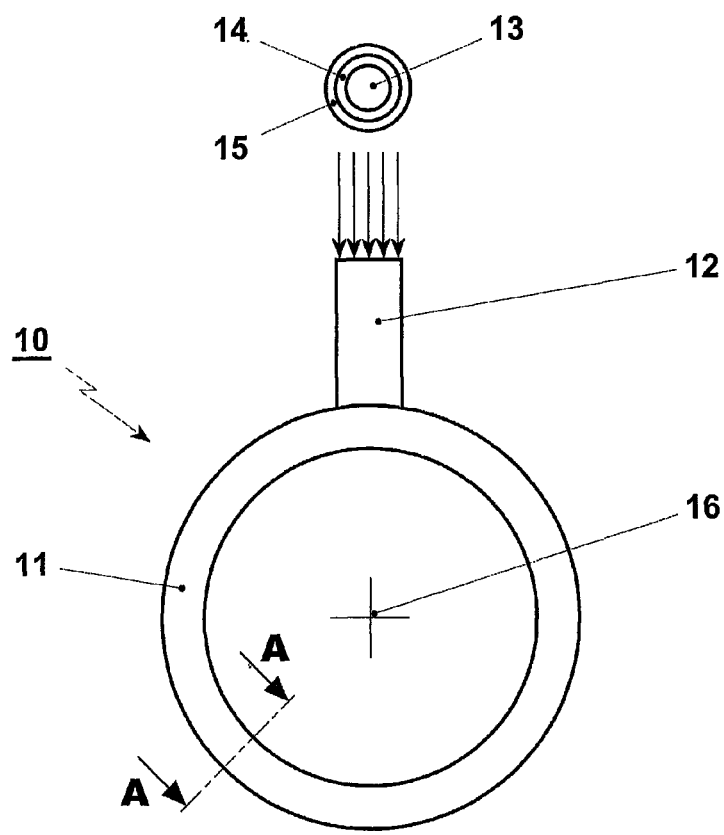
FIG. 1 shows in an axial view a circular injector, which is designed to inject a liquid fuel, shielding air and a fuel gas, according to an embodiment of the invention.

In order to improve the mixing of fuel and air the following mixer is proposed:

FIG. 1 shows in a first embodiment of the invention a general arrangement of a single "ring" mixer.

The basic principle of the "ring" system is that of a circular injector 10 comprising an injector ring 11, which is able to inject three different fluid streams: liquid fuel 13 (e.g. oil), fuel gas (15) and shielding air 14 in between (similar to the well-known SEV lance of the GT24/GT26 gas turbines, as described for example in EP 0 620 362 A1). The three fluids are fed to the injector ring 11 by means of a concentric duct arrangement in a fluid supply arrangement 12.

Figure 2:
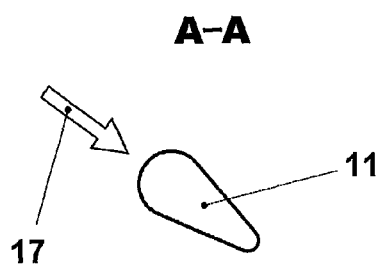
FIG. 2 shows the cross section of the injector ring of FIG. 1, which is similar to a symmetrical aerodynamic profile.

In the axial direction (axis 16) the injector ring 11 will have an aerodynamic profile, similar to a symmetric airfoil (FIG. 2), with a design similar to that described in documents WO 2011/054757 and WO 2011/054766, which allows low pressure drop and effective convective cooling inside the lance. FIG. 2 shows a schematic of such configuration, indicating the aerodynamic profile aligned with the main hot gas flow direction 17.

Three embodiments of such an injector ring 18 are considered and shown in a simplified scheme in FIG. 3 (in each of the three embodiments the respective injection nozzle and vortex generator configuration extends along the whole circumference of the ring, while in FIG. 3 only exemplary sections are shown for simplicity).

In the first embodiment (FIG. 3(a)) vortex generators (VGs) 20a,b at the inside and outside of the injector ring 18a are coupled with inline injection: The injector nozzles 19 are aligned with the main hot gas flow (axis 16). Mixing is enhanced by the dedicated VGs 20a and 20b creating vertical structures helping to distribute of the fuel. The advantage of inline injection is cheaper manufacturability, lower impact of momentum flux ratio on performances, higher flashback margin/fuel flexibility.

In the second embodiment (FIG. 3(b)) vortex generators 22a and 22b are coupled with inclined injection: The injector nozzles 21a, 21b are inclined in a crossflow arrangement so that the fuel can better penetrate into the vertical structures created by VGs 22a, 22b similar to the previous embodiment. This can provide better mixing for lower NOx emissions.

The third embodiment (FIG. 3(b)) is related to lobes 24a, 24b combined with inline injection by means of injection nozzles 23: Lobed structures create the velocity field necessary to optimize mixing of fuel and air. Lobes can achieve similar mixing levels with smaller pressure drop. They are derived from WO 2011/054757 and WO 2011/054766 and include all variants described in those patent applications.

For large round contours one could as well imagine a multi-ring blender (e.g. several injector rings of different sizes (radius etc.) at the same plane (perpendicular to axis 16) or several rings of different sizes at different axial locations along axis 16).

For large cylindrical burners or cans, a multi-ring configuration is envisaged, e.g. several rings of different sizes at the same axial plane or several rings of different sizes at different axial locations.

The advantages of invention are:
Better mixing=>less emissions released;
shorter mixing length=>compact design;
axial staging of fuel injection possible=>prevention of combustion dynamics due to different time lags;
fitting a cylindrical burner or can;
easily possible to be adapted to different burner or can sizes, by adding nozzles or rings.

The invention claimed is:

1. A mixing arrangement for mixing a fuel with a stream of oxygen containing gas flowing along an axis in an axial channel in a second combustor of a gas turbine with sequential combustion, said mixing arrangement comprising:
an injector with at least one injector ring for injecting plural streams of different fluid types into the second combustor, wherein said at least one injector ring has a plurality of injection nozzles for injecting the plural streams of different fluid types distributed circumferentially in a plane perpendicular to said axis, wherein at least one of the plurality of injection nozzles injects a stream of a respective fluid in a direction of said stream of oxygen containing gas flowing along said axis, said stream of oxygen containing gas passes inside and outside the at least one injector ring along said axis, and said at least one injector ring has an aerodynamic profile in an axial direction.

2. The mixing arrangement according to claim 1, wherein said at least one injector ring is circular with respect to said axis.

3. The mixing arrangement according to claim 1, wherein said at least one injector ring has the aerodynamic profile of a symmetric airfoil with a symmetry plane being aligned with said axis.

4. The mixing arrangement according to claim 1, wherein said at least one injector ring is designed to inject a plurality of streams of different fluids.

5. The mixing arrangement according to claim 4, wherein said at least one injector ring is designed to inject a stream of liquid fuel, a stream of air, and a stream of fuel gas in a direction along said axis.

6. The mixing arrangement according to claim 4, wherein at least three of the plurality of injection nozzles are arranged to each inject a different fluid into the second combustor.

7. The mixing arrangement according to claim 4, wherein the plurality of injection nozzles are arranged in plural sets of at least three nozzles, and at least three nozzles within each set injects a different fluid into the second combustor.

8. The mixing arrangement according to claim 1, an injection direction of each nozzle being aligned with said axis.

9. The mixing arrangement according to claim 8, further comprising vortex generators provided on said at least one injector ring.

10. The mixing arrangement according to claim 9, wherein said vortex generators are circumferentially distributed on said at least one injector ring such that each of said vortex generators corresponds to one of said plurality of inline injection nozzles.

11. The mixing arrangement according to claim 10, wherein said vortex generators are arranged alternating on the inside and on the outside of said at least one injector ring.

12. The mixing arrangement according to claim 8, further comprising lobes provided between neighbouring inline injection nozzles.

13. The mixing arrangement according to claim 12, wherein said lobes are extending alternating to the inside and the outside of the at least one injector ring.

14. The mixing arrangement according to claim 1, an injection direction of each nozzle being in crossflow orientation with respect to said stream of gas.

15. The mixing arrangement according to claim 1, further comprising a plurality of injector rings is provided in a multi-ring configuration.

16. The mixing arrangement according to claim 15, wherein the plurality of injector rings are of different sizes and are arranged in a same plane.

17. The mixing arrangement according to claim 15, wherein the plurality of injector rings are of different size and are arranged at different axial locations.

18. The mixing arrangement according to claim 1, wherein each type of fluid is supplied to a respective injection nozzle via a duct, the ducts for each type of fluid being nested and concentric about a supply axis of the injector.

* * * * *